United States Patent [19]

Nakajima

[11] Patent Number: 4,804,842
[45] Date of Patent: Feb. 14, 1989

[54] RADIATION IMAGE READ-OUT METHOD AND APPARATUS

[75] Inventor: Nobuyoshi Nakajima, Kanagawa, Japan

[73] Assignee: Fuji Photo Film Co., Ltd., Kanagawa, Japan

[21] Appl. No.: 16,592

[22] Filed: Feb. 19, 1987

Related U.S. Application Data

[63] Continuation of Ser. No. 896,146, Aug. 13, 1986.

[30] Foreign Application Priority Data

Aug. 15, 1985 [JP]  Japan ................................ 60-179867

[51] Int. Cl.[4] ............................................ G01N 23/04
[52] U.S. Cl. .............................. 250/327.2; 364/413.26; 382/22
[58] Field of Search .......................... 250/327.2, 484.1; 364/414; 382/53, 52, 51, 50, 22

[56] References Cited

U.S. PATENT DOCUMENTS

| | | | |
|---|---|---|---|
| 4,258,264 | 3/1981 | Kotera et al. | 250/484.1 |
| 4,346,295 | 8/1982 | Tanaka et al. | 250/327.2 |
| 4,538,227 | 8/1985 | Toraichi et al. | 364/414 |
| 4,620,097 | 10/1986 | Tanaka et al. | 250/327.2 |

FOREIGN PATENT DOCUMENTS

| | | | |
|---|---|---|---|
| 170270 | 2/1986 | European Pat. Off. | 250/327.2 |
| 11395 | 2/1981 | Japan | 250/327.2 |

Primary Examiner—Janice A. Howell
Assistant Examiner—Constantine Hannaher
Attorney, Agent, or Firm—Sughrue, Mion, Zinn, Macpeak, and Seas

[57] ABSTRACT

In a radiation image read-out system wherein a radiation image recorded on a recording medium through an irradiation field stop is read out and the read-out image signals are subjected to an image processing, the image processing conditions are determined or adjusted based on the histogram of the image signals. In a radiation image read-out system wherein a radiation image is recorded on a recording medium through an irradiation field stop and preliminary read-out is conducted prior to final read-out, and the image signals read out by the final read-out are subjected to an image processing, final read-out conditions and/or image processing conditions are determined or adjusted based on the histogram of the image signals obtained by the preliminary read-out. In both cases, prospective edge point signals, which are considered to be signals representing edge portions of an irradiation field on the stimulable phosphor sheet, are detected from the image signals. A region of a level lower than a characteristic value representing the prospective edge point signals is removed from the histogram, and the final read-out conditions and/or the image processing conditions are adjusted based on the histogram outside of the lower level region.

15 Claims, 4 Drawing Sheets

RADIATION IMAGE READ-OUT METHOD AND APPARATUS

RELATED CASES

This application is a continuation in part of U.S. Ser. No. 896,146, filed Aug. 13, 1986.

BACKGROUND OF THE INVENTION

1. Field of the Invention

This invention relates to a method of reading out a radiation image stored on a stimulable phosphor sheet by exposing the stimulable phosphor sheet to stimulating rays which cause it to emit light in proportion to the stored radiation energy, and photoelectrically detecting the emitted light. This invention particularly relates to a radiation image read-out method wherein preliminary read-out is conducted for approximately detecting the image input information prior to final read-out for reproducing a visible image. This invention also relates to an apparatus for carrying out the method.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a simulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored thereon, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored on the stimulable phosphor varies over a vey wide range in proportion to the amount of energy stored thereon, it is possible to obtain an image having desirable density regardless of the amount of exposure of the stimulable phosphor to the radiation by reading out the emitted light with an appropriate read-out gain and converting it to an electric signal to reproduce a visible image on a recording medium or a display device. The electric signal may further to processed as desired to obtain a radiation image suitable for viewing, particularly for diagnostic purposes. This is very advantageous in practical use.

As mentioned above, in the radiation image system using a stimulable phosphor sheet, compensation for deviation of the level of the radiation energy stored on the stimulable phosphor sheet from a desired level can easily be carried out by adjusting the read-out gain to an appropriate value when photoelectrically reading out the light emitted by the stimulable phosphor sheet upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor sheet or the photodetector, a change in radiation dose according to the condition of the object, or a fluctuation in the radiation transmittance according to the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted from the stimulable phosphor sheet into an electric signal, and processing the electric signal as desired.

However, in order to eliminate various influences caused by the fluctuation of radiographic exposure conditions and/or to obtain a radiation image having a high image quality or a high diagnostic efficiency and accuracy, it is necessary to investigate such image input conditions of the radiation image stored on the stimulable phosphor sheet as, for example, the level of radiation dose used for image recording, or the image input pattern which is determined by the portion of the body (e.g. the chest or the abdomen) or the radiographic method used, such as plain image or contrasted image radiographing, before reproducing the radiation image to a visible image, and then to adjust the read-out gain appropriately or to process the electric signal appropriately based on the detected image input conditions or the image input pattern. The image input conditions and the image input pattern will hereinafter be simply referred to as the image input information when they are referred to generically. It is also necessary to determine the scale factor to optimize the resolution according to the contrast of the image input pattern.

Investigation of the image input information may be conducted prior to the visible image reproduction by use of the method as disclosed in Japanese Unexamined Patent Publication No. 58(1983)-67240 (corresponding to U.S. Pat. No. 4,527,060). In the disclosed method, a read-out operation for detecting the image input information of a radiation image stored on a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out gain is adjusted, and/or an appropriate signal processing is conducted, and/or the scale factor is adjusted to an appropriate value on the basis of the image input information obtained by the preliminary read-out.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like positioned on the optical path. Alternatively, a simulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increase, or the moving speed of the stimulable phosphor sheet may be increased in the preliminary read-out.

In the aforesaid method, since the image input conditions and the image input pattern of a radiation image stored on the stimulable phosphor sheet can be investigated in advance, it is possible to obtain a radiation image having an improved image quality, particularly a high diagnostic efficiency and accuracy by adjusting the read-out gain and the scale factor on the basis of the detected image input information and by processing the detected electric signal in the manner most suitable for the image input pattern without using a read-out system having a wide dynamic range.

Various methods have been proposed for ascertaining the image input information on the stimulable phosphor sheet based on the preliminary read-out image signal obtained by the preliminary read-out. As one of such methods, it has heretofore been known to create a histogram of the preliminary read-out image signals. With this method, the image input information may be ascertained, for example, based on the maximum signal value, the minimum signal value, or a signal value at which the frequency is the maximum in the histogram. Therefore, it becomes possible to reproduce a visible image having an improved image quality, particularly a high diagnostic efficiency and accuracy by adjusting final read-out conditions such as the read-out gain and the scale factor and/or the image processing conditions based on the histogram.

Figures 3, 4, 5:
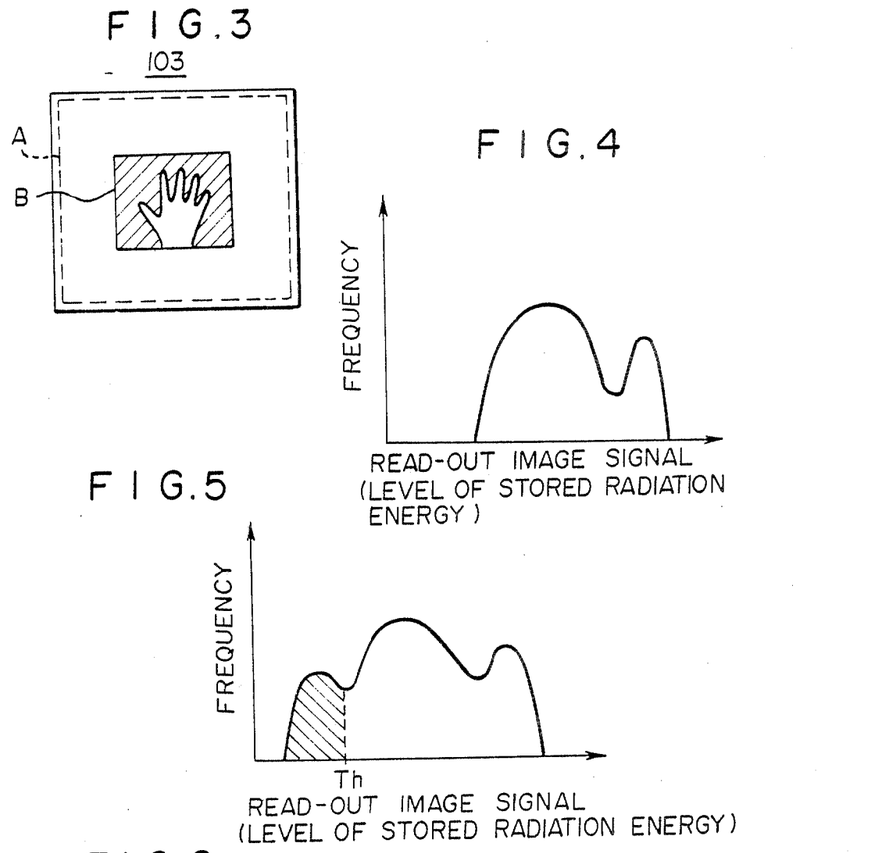
FIG. 3 is an explanatory view showing the condition of a radiation image stored on a stimulable phosphor sheet.
FIGS. 4 and 5 are graphs showing examples of the histograms of the preliminary read-out image signals.

However, when the image input informatin on the stimulable phosphor sheet is ascertained as described above, the problem as described below arises. FIG. 3 is an explanatory view showing the condition of a radiation image stored on a stimulable phosphor sheet. As shown in FIG. 3, when a irradiation field B is limited to an area smaller than an image recording region A on a stimulable phosphor sheet 103 and the preliminary read-out is conducted over an area markedly larger than the irradiation field B, for example, over the whole image recording region A, the image input information actually stored within the irradiation field B is detected incorrectly. Specifically, in the aforesaid case, since the preliminary read-out image signals at regions outside of the irradiation field B are also included in the histogram, the histogram does not accurately represents the actual image input information within the irradiation field B.

Further, in the case where the preliminary read-out is not carried out, it is possible to conduct the image processing on the image signals based on the histogram of the image signals. Furthermore, even in the case where the preliminary read-out is carried out, it is possible to conduct the image procesing on the image signals based on the histogram of the image signals obtained by the final read-out. In all of these cases, there is a problem as mentioned above when the radiation image was recorded through an irradiation field stop.

The aforesaid problem may be eliminated by recognizing the irradiation field B by a method as described, for example, in Japanese Patent Application No. 59(1984)-160355, (corresponding to published European Application No. 170,270/1985 and to U.S. patent application Ser. No. 760,862 filed July 31, 1985, and continuing as Ser. No. 164,654) and carrying out the preliminary read-out only for the recognized irradiation field. However, in order to recognize the irradiation field with this method, it is necessary to use an expensive calculation apparatus using a complicated algorithm.

SUMMARY OF THE INVENTION

The primary object of the present invention is to provide a radiation image read-out method wherein image input information within an irradiation field is ascertained accurately by preliminary read-out even though the irradiation field on a stimulable phosphor sheet is limited.

Another object of the present invention is to provide a radiation image read-out method which can be carried out with a simple apparatus.

A more specific object of the present invention is to provide a radiation image read-out method in which the final read-out conditions and/or the image processing conditions are accurately determined or adjusted based on the preliminary read-out image signals even though the irradition field is limited.

Another specific object of the present invention is to provide a radiation image read-out method in which the image processing conditions are accurately determined or adjusted based on the image signals obtained by the final read-out whether or not the preliminary read-out is conducted.

Still another object of the present invention is to provide an apparatus for carrying out the radiation image read-out method.

The present invention provides a radiation image read-out method in which, prior to final read-out for exposing a stimulable phosphor sheet exposed to a radiation passing through an object to have a radiation image of the object stored thereon to stimulating rays which cause the stimulable phosphor sheet to emit light in proportion to the stored radiation energy, and photo-electrically detecting the emitted light to obtain an electric image signal for reproducing a visible image, preliminary read-out for approximately detecting the radiation image stored on the stimulable phosphor sheet is conducted by one of stimulating rays of a level lower than the level of stimulating rays used in the final read-out, read-out conditions in the final read-out and/or image processing conditions are adjusted on the basis of the information obtained by the preliminary read-out, and the final read-out is conducted by use of the adjusted conditions, wherein the improvement comprises the steps of:

(i) creating a histogram of preliminary read-out image signals obtained by said preliminary read-out, (ii) detecting prospective edge point signals, which are considered to be signals representing edge portions of an irradiation field on said stimulable phosphor sheet, from said preliminary read-out image signals,    (iii) removing a region of a level lower than the level of a characteristic value representing said prospective edge point signals from said histogram, and    (iv) adjusting said read-out conditions in the final read-out and/or said image processing conditions on the basis of said histogram outside of said lower level region.

The prospective edge point signals may be detected, for example, by differentiation processing of digitized preliminary read-out image signals. The differentiation processing may be one-dimensional differentiation of first or higher order, or two-dimensional differentiation of first or higher order. For a discretely sampled image, differentiation is equivalent to calculation of differences between image signals present in the vicinity.

The present invention also provides a radiation image read-out apparatus including:

(i) a final read-out system comprising a means for emitting stimulating rays to a stimulable phosphor sheet carrying a radiation image stored thereon, a means for moving said stimulable phosphor sheet, and a light detection means for photoelectrically detecting light carrying the radiation image and emitted by said stimulable phosphor sheet upon exposure to stimulating rays, and    (ii) a preliminary read-out system comprising a means for emitting stimulating rays, a means for moving said stimulable phosphor sheet, and a light detection means for photoelectrically detecting the light carrying the radiation image and emitted by said stimulable phosphor sheet upon exposure to stimulating rays, the stimulation energy of stimulating rays in the preliminary read-out being lower than the stimulation energy of stimulating rays in the final readout,    wherein the improvement comprises the provision of:

(iii) a means for creating a histogram of preliminary read-out image signals obtained by said preliminary read-out,    (iv) a means for detecting prospective edge point signals, which are considered to be signals representing edge portions of an irradiation field on said stimulable phosphor sheet, from said preliminary read-out image signals, and    (v) a histogram correction means for removing a region of a level lower than the level of a characteristic value representing said prospective edge point signals from said histogram.

Further, the present invention provides a radiation image read-out method in which a stimulable phosphor sheet exposed to a radiation passing through an object and through an irradiation field stop to have a radiation image of the object stored thereon is exposed to stimulating rays which cause the stimulable phosphor sheet to emit light in proportion to the stored radiation energy, and the emitted light is photoelectrically detected to obtain an electric image signal for reproducing a visible image, and image processing conditions are adjusted on the basis of the information obtained by the photoelectrical image read-out,    wherein the improvement comprises the steps of:

(i) creating a histogram of final read-out image signals obtained by said final read-out,    (ii) detecting prospective edge point signals, which are considered to be signals representing edge portions of an irradiation field on said stimulable phosphor sheet, from said final read-out image signals,    (iii) removing a region of a level lower than the level of a characteristic value representing said prospective edge point signals from said histogram, and    (iv) adjusting said image processing conditions on the basis of said histogram outside of said lower level region.

In the present invention, it is possible to accurately detect the image input information on an object by eliminating adverse effects of the section outside of the irradiation field, and to accurately adjust the image read-out conditions in the final read-out and/or the image processing conditions. Therefore, it becomes possible to always reproduce a visible image having an improved image quality, particularly a high diagnostic efficiency and accuracy. Further, in the method of the present invention, since the adverse effects of the section outside of the irradiation field are eliminated without recognizing the irradiation field, the method may be carried out with a simpler and more inexpensive apparatus than an apparatus wherein irradiation field recognition is conducted.

Since the read-out image signal is proportional to the level of energy of the radiation impinging upon the stimulable phosphor sheet at the recording step, image signals outside of the irradiation field are generally of low quantum levels, and image signals within the irradiation field are generally of high quantum levels. Therefore, when the differentiation processing is conducted in a predetermined picture element array direction on the stimulable phosphor sheet and the difference exceeds a predetermined value at a point, the point may be regarded as present on the edge of the irradiation field. That is, the image signal at said point may be regarded as the prospective edge point signal. Since the prospective edge point signal represents the edge portion which is a transition point from outside of the irradiation field exposed to no radiation to the inside of the irradiation field, the prospective edge point signal is normally of a level lower than the levels of the image signals representing the image within the irradiation field. Therefore, a region of a level lower than a characteristic value representing the prospective edge point signals, for example, a signal value at which the frequency is the maximum, the minimum value, or a median value of the histogram of the prospective edge point signals, is removed from the histogram of the image signals including the read-out signals outside of the irradiation field. Thus it is possible to obtain a histogram wherein almost all of the read-out signals outside of the irradiation field are eliminated, i.e. a histogram of almost only the image signals inside of the irradiation field. Namely, the histogram after removal of the aforesaid lower level region accurately represents the radiation image stored on the stimulable phosphor sheet.

With the aforesaid differentiation processing, no prospective edge point signal is detected for an edge portion parallel with the differentiation direction. However, in the present invention, the irradiation field itself need not be detected, and only the levels of the prospective edge point signals should be detected. Therefore, the differentiation direction may be selected arbitrarily, and several prospective edge point signals may be detected.

In the case where the prospective edge point signals are detected by the differentiation processing, an image portion within the irradiation field where the image density changes sharply, for example, a bone edge portion, may be detected as a prospective edge point signal.

However, when all of the prospective edge point signals are processed, and the characteristic value representing the prospective edge point signals, such as the signal value at which the frequency is the maximum, is calculated, said characteristic value becomes approximately equal to the level of the signal representing the actual edge portion of the irradiation field. Accordingly, when the region of a level lower than the characteristic value is removed from the histogram of the image signals, the image signals within the irradiation field which have levels higher than the edge portion of the irradiation field are not substantially eliminated from the histogram.

DESCRIPTION OF THE PREFERRED EMBODIMENTS

The present invention will hereinbelow be described in further detail with reference to the accompanying drawings.

Figure 1:
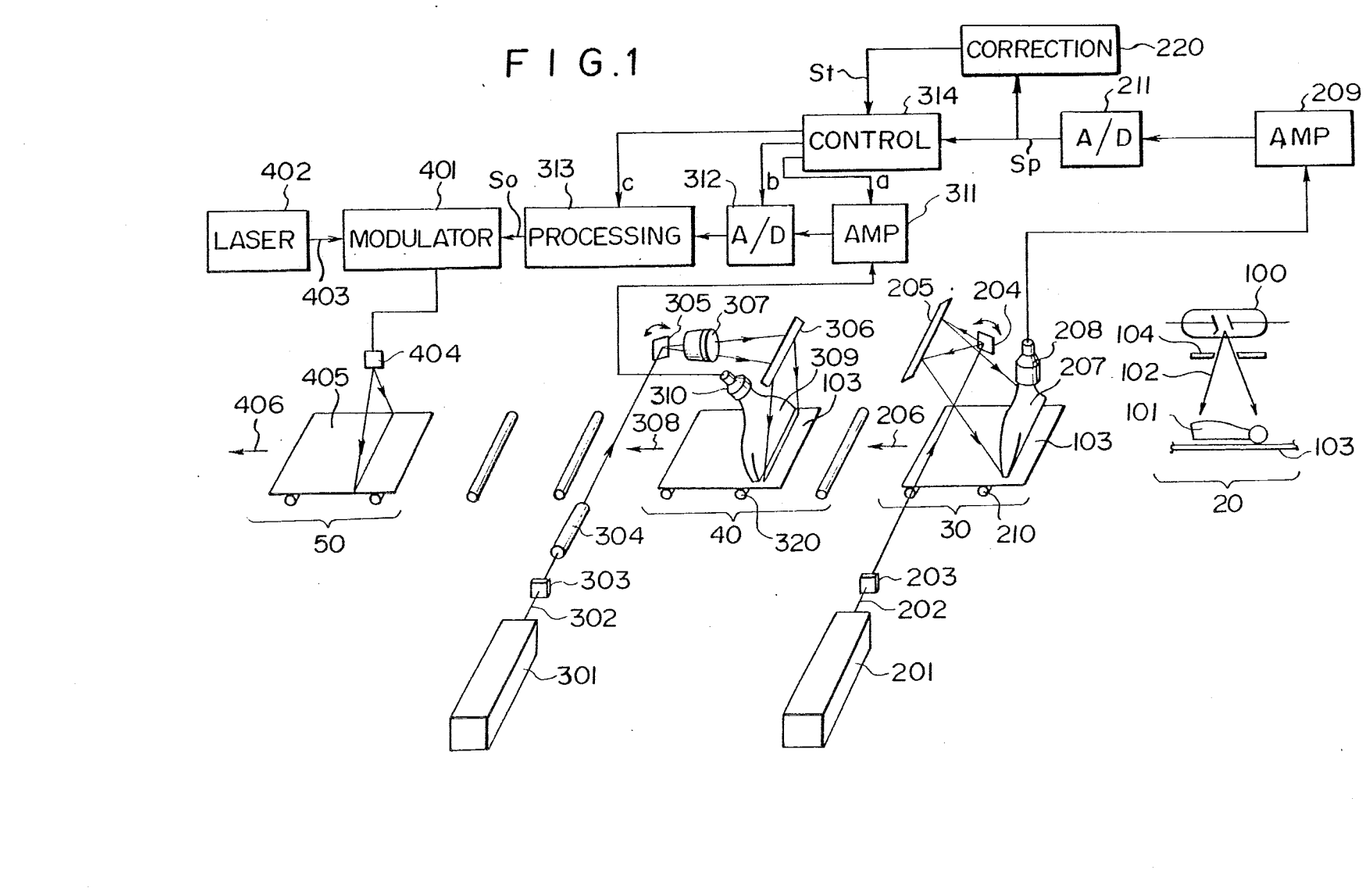
FIG. 1 is a schematic view showing the radiation image recording and reproducing system wherein an embodiment of the radiation image read-out method in accordance with the present invention is employed.

FIG. 1 shows a radiation image recording and reproducing system wherein radiation image read-out is carried out by an embodiment of the radiation image read-out method in accordance with the present invention. Basically, the radiation image recording and reproducing system comprises a radiation image recording section 20, a preliminary read-out section 30, a final read-out section 40, and an image reproducing section 50. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103. An irradiation field stop 104 for limiting the irradiation field of the radiation 102 is positioned between the radiation source 100 and the object 101.

The stimulable phosphor sheet 103 carrying the radiation image of the object 101 stored thereon is sent to the preliminary read-out section 30 by a sheet conveyance means 110 constituted by a conveyor roller or the like. At the preliminary read-out section 30, a laser beam 202 emanated by a laser beam source 201 is first passed through a filter 203 for cutting off light having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam souce 201 is selected so that the laser beam 202 emitted thereby has a wavelength distribution different from and far part from the wavelength distribution of the light emitted by the stimulable phosphor sheet 103 upon stimulation thereof. While the laser beam 202 impinge upon the stimulable phosphor sheet 103, the stimulable phosphor sheet 103 is moved in the direction as indicated by the arrow 206 (i.e. the sub-scanning direction) by a sheet conveying means 210 constituted by conveyor rollers or the like and, thus, the whole surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the stimulation energy of the laser beam 202 for preliminary read-out is smaller than the stimulation energy of the laser beam for final read-out conducted at the final read-out section 40.

When exposed to the laser beam 202 as mentioned above, the stimulable phosphor sheet 103 emits light in proportion to the radiation energy stored thereon, and the emitted light enters a light guide member 207 which may be of a shape and a material as disclosed in U.S. Pat. No. 4,346,295. The light is guided inside of the light guide member 207 through total reflection, emanated from a light output face of the light guide member 207 and received by a photodetector 208 constituted by a photomultiplier or the like. The light receiving face of the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into an electric signal carrying the image input information, and amplified by an amplifier 209. The signal generated by the amplifier 209 is digitized by an A/D converter 211, and sent as a preliminary read-out image signal Sp to a final read-out control circuit 314 at the final read-out section 40. On the basis of the image input information represented by the preliminary read-out image signal Sp, the final read-out control circuit 314 calculates a read-out gain setting value (a), a scale factor setting value (b), and a reproduced image processing condition setting value (c). The preliminary read-out image signal Sp is also sent to a correction circuit 220 which will be described in detail later.

After the preliminary read-out is finished, the stimulable phosphor sheet 103 is sent to the final read-out section 40. At this section, a laser beam 302 emitted by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is positioned an fθ lens 307 for maintaining the beam diameter of the laser beam 302 uniform during the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. sub-scanning direction) by a sheet conveying means 320 constituted by conveyor rollers or the like and, consequently, the whole area of the stimulable phosphor sheet 103 is exposed to and scanned by the laser beam 302. Upon exposure to the laser beam 302, the stimulable phosphor sheet 103 emits light in proportion to the radiation energy stored therein, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emitted from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 the read-out gain of which has been adjusted by the read-out gain setting value (a) calculated by the control circuit 314. The amplified electric signal is input to an A/D converter 312 which converts the electric signal into a digital signal by use of a scale factor which has been adjusted by the scale factor setting value (b) to suit the width of signal fluctuation. The digital signal thus obtained is sent to a signal processing circuit 313, in which it is processed on the basis of the reproduced image processing condition setting value (c) so as to obtain a radiation image suitable for viewing, particularly for diagnostic purposes, and is output as a read-out image signal (final read-out image signal) So.

The final read-out image signal So generated by the signal processing circuit 313 is input to a light modulator 401 at the image reproducing section 50. At the image reproducing section 50, a laser beam 403 emitted by a reproducing laser beam source 402 is modulated by the light modulator 401 on the basis of the final read-out image signal So received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction as indicated by the arrow 406. Accordingly, the radiation image represented by the final read-out image signal So is recorded on the photosensitive material 405. For reproducing the radiation image, it is possible to use any other appropriate method such as the aforesaid displaying on a CRT.

Figure 2:
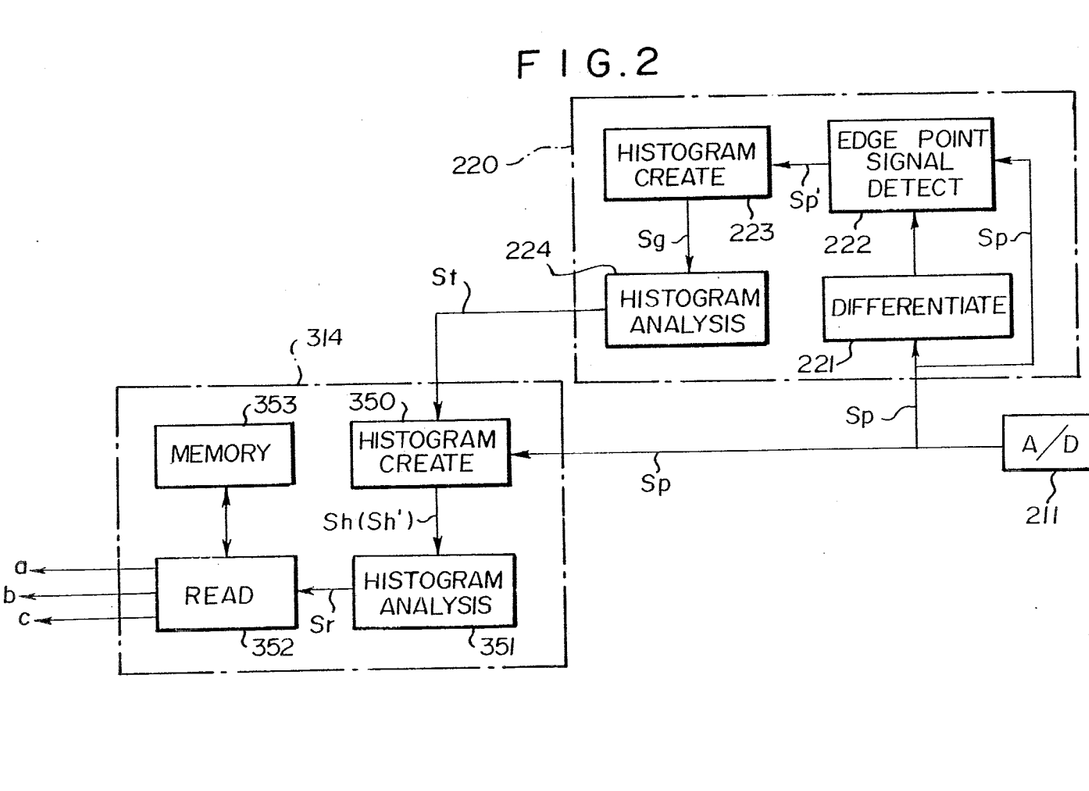
FIG. 2 is a block diagram showing a part of the radiation image recording and reproducing system of FIG. 1.

A technique of accurately adjusting the read-out gain setting value (a), the scale factor setting value (b) and the reproduced image processing condition setting value (c) even though the irradiation field on the stimulable phosphor sheet 103 is limited as shown in FIG. 3 will hereinbelow be described with reference to FIG. 2. As shown in FIG. 2, the control circuit 314 comprises a histogram creating section 350, a histogram analysis section 351, a read section 352, and a memory section 353. The aforesaid preliminary read-out image signals Sp are sent to the histogram creating section 350 which creates a histogram of all of the preliminary read-out image signals Sp. In the case where the irradiation field is not limited, the histogram becomes as shown, for example, in FIG. 4. On the other hand, when the irradiation field is limited on the stimulable phosphor sheet 103, the histogram becomes, for example, as shown in FIG. 5.

In the case where the irradiation field is not limited, a signal Sh directly representing the histogram is sent to the histogram analysis section 351, which analyzes the histogram based on the histogram signal Sh, calculates the maximum value, the minimum value, the signal value at which the frequency is the maximum, or the like, and sends a signal Sr representing the calculated value to the read section 352. The memory section 353 stores the read-out gain setting value (a), the scale factor setting value (b), and the reproduced image processing condition setting value (c) suitable for the aforesaid maximum value, the minimum value, the signal value at which the frequency is the maximum, or the like. The read section 352 reads the setting values (a), (b) and (c) suitable for the signal Sr from the memory section 353, and sends them respectively to the amplifier 311, the A/D converter 312, and the signal processing circuit 313.

Figure 6:
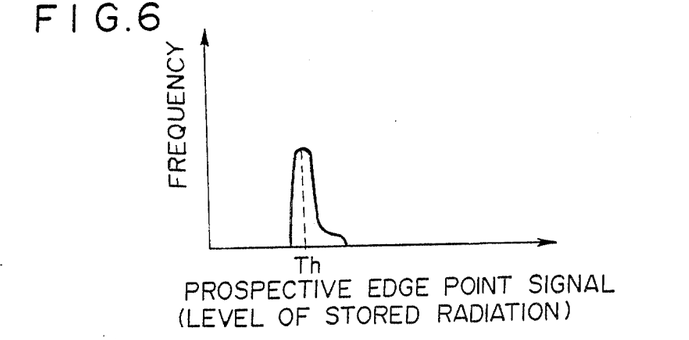
FIG. 6 is a graph showing an example of the histogram of the prospective edge point signals.

On the other hand, in the case where the irradiation field is limited on the stimulable phosphor sheet 103, the histogram created at the histogram creating section 350 is corrected, and a signal Sh' representing the corrected histogram is sent to the histogram analysis section 351. Correction of the histogram is conducted as described below. The correction circuit 220 comprises a differentiation processing section 221, a prospective edge point signal detecting section 222, a histogram creating section 223, and a histogram analysis section 224. In the correction circuit 220, the preliminary read-out image signals Sp are input to the differentiation processing section 221 and the prospective edge point signal detecting section 222. The differentiation processing section 221 differentiates the digitized preliminary read-out image signals Sp in a predetermined picture element array direction, and calculates the differences as described above. The prospective edge point signal detecting section 222 extracts the preliminary read-out image signals Sp at points where the calculated differences exceed a predetermined value, and sends only the extracted preliminary read-out image signals Sp' to the histogram creating section 223. Almost all of the preliminary read-out image signals Sp' thus extracted become the image signals representing the edge portions of the irradiation field B on the stimulable phosphor sheet 103 as shown in FIG. 3, i.e. the prospective edge point signals. (As described above, some of the extracted preliminary read-out image signals Sp' may be the image signals at bone edge portions in the image inside of the irradiation field.) The histogram creating section 223 creates the histogram of the prospective edge point signals Sp'. Thus a histogram as shown, for example, in FIG. 6 is obtained. A signal Sg representing the histogram thus obtained is input to the histogram analysis section 224. Based on the signal Sg, the histogram analysis section 224 calculates a signal value Th at which the frequency is the maximum in the histogram as shown in FIG. 6. The maximum frequency signal value Th is somewhat different from the image signals at bone edge portions or the like, and is approximately equal to the levels of most of the signals representing the edge portions of the irradiation field B. Thus the maximum frequency signal value Th is calculated as the characteristic value representing the prospective edge point signals Sp′, and a signal St representing the maximum frequency signal value Th is input to the histogram creating section 350 of the control circuit 314.

Upon receiving the signal St, the histogram creating section 350 corrects the created histogram so that a region of a level lower than the maximum frequency signal value Th is removed, i.e. the region hatched in FIG. 5 is removed. Therefore, in this case, the read-out gain setting value (a), the scale factor setting value (b), and the reproduced image processing condition setting value (c) are adjusted on the basis of the histogram corrected as described above. The corrected histogram is constituted almost only by the image signals inside of the irradiation field B. Therefore, when the setting values (a), (b) and (c) are adjusted based on the corrected histogram, it becomes possible to adjust them to values appropriate for the radiation image actually stored on the stimulable phosphor sheet 103.

A switch for controlling the operation of the correction circuit 220 should preferably be provided so that the histogram correction is carried out only when the irradiation field B is limited. Also, the differentiation processing section 221 may be constituted to smooth in advance the preliminary read-out image signals Sp at a plurality of adjacent picture elements, and to differentiate the smoothed digital image signals.

Further, instead of using the maximum frequency signal value Th in the histogram of the prospective edge point signals Sp′ as the characteristic value representing the prospective edge point signals Sp′, it is also possible to use, for example, the minimum value or a median value of the prospective edge point signals Sp′.

Also, as described, for example, in Japanese Unexamined Patent Publication No. 58(1983)-67242, (also corresponding to U.S. Pat. No. 4,527,060) a single read-out system may be used for the preliminary read-out and the final read-out. In this case, after the preliminary read-out is finished, the stimulable phosphor sheet is returned to the read-out system by a sheet conveyance means and then the final read-out is conducted. In the preliminary read-out step, the energy of the stimulating rays is adjusted to be lower than the energy of the stimulating rays used in the final read-out. The present invention is also applicable to such a case.

In the above-described embodiments, the image read-out conditions and/or the image processing conditions are adjusted based on the preliminary read-out image signals. However, it is possible to determine or adjust the image processing conditions based on the image signals obtained by the final read-out. The final read-out may be not only the image read-out referred to as "final read-out" in the embodiment described hereinabove in the image read-out system in which both the preliminary read-out and the final read-out are carried out, but also the image read-out in a radiation image read-out system in which only one step of image read-out is carried out. In both cases, the image read-out step carried out to obtain the image signals to be subjected to image processing is referred to as "final read-out" or simply as "image read-out" in this specification.

In the above-described embodiments wherein the preliminary read-out is carried out, it is possible to adjust the image processing conditions based on the histogram of the image signals obtained by the final read-out. Further, even in the case where the preliminary read-out is not carried out, it is possible to adjust the image processing conditions based on the histogram of the image signals obtained by the final read-out.

Figure 7:
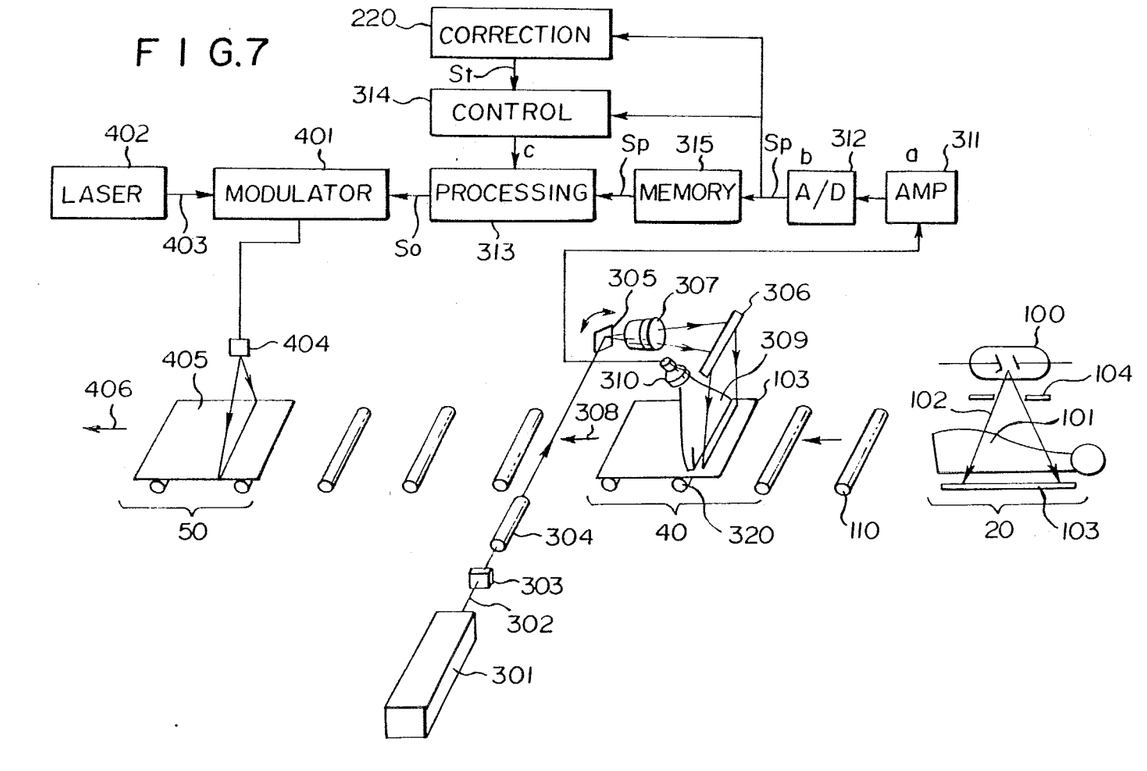
FIG. 7 is a schematic view showing another embodiment of the radiation image read-out method in accordance with the present invention in which the preliminary read-out is not carried out.

As another embodiment of the present invention, an example of the latter case will hereinbelow be described in detail with reference to FIG. 7. In FIG. 7, all the elements corresponding to those shown in FIG. 1 are designated by the same reference numerals, and accordingly the detailed description of those elements will be omitted here. Only the features different from those described with reference to FIG. 1 will be described in detail hereinbelow.

FIG. 7 shows a radiation image recording and reproducing system wherein radiation image read-out is carried out by another embodiment of the radiation image read-out method in accordance with the present invention. Basically, the radiation image recording and reproducing system comprises a radiation image recording section 20, a final read-out section (or an image read-out section) 40, and an image reproducing section 50.

The output of the photodetector 310 is amplified to an appropriate level by an amplifier 311 the read-out gain of which has been adjusted.

Prospective edge point signals representing edge portions of the stimulable phosphor sheet, are detected from the final read-out image signals. A region of a level lower than a characteristic value representing the prospective edge point signals is removed from the histogram, and the image processing conditions are adjusted based on the histogram outside of the lower level region.

I claim:

1. A radiation image read-out method in which, prior to final read-out for exposing a stimulable phosphor sheet exposed to a radiation passing through an object to have a radiation image of the object stored thereon to stimulating rays which cause the stimulable phosphor sheet to emit light in proportions to the stored radiation energy, and photoelectrically detecting the emitted light to obtain an electric image signal for reproducing a visible image, preliminary read-out for approximately detecting the radiation image stored on the stimulable phosphor sheet is conducted by use of stimulating rays of a level lower than the level of stimulating rays used in the final read-out, read-out conditions in the final read-out and/or image processing conditions are adjusted on the basis of the information obtained by the preliminary read-out, and the final read-out is conducted by use of the adjusted conditions, wherein the improvement comprises the steps of:

(i) creating a histogram of frequencies of preliminary read-out image signals obtained by said preliminary read-out versus levels of said preliminary read-out signals, (ii) detecting prospective edge point signals, which are considered to be signals representing edge portions of an irradiation field on said stimulable phosphor sheet, from said preliminary read-out image signals, (iii) removing a region of a level lower than the level of a characteristic value representing said prospective edge point signals from said histogram, and (iv) adjusting said read-out conditions in the final read-out and/or said image processing conditions on the basis of said histogram outside of said lower level region.

2. A method as defined in claim 1 wherein said characteristic value is a maximum frequency signal value of a histogram of said prospective edge point signals.

3. A method as defined in claim 1 wherein said characteristic value is the minimum value of said prospective edge point signals.

4. A method as defined in claim 1 wherein said characteristic value is a median value of said prospective edge point signals.

5. A method as defined in any of claims 1 to 4 wherein said prospective edge point signals are detected by digitizing said preliminary read-out image signals and conducting a differentiation processing of the digitized preliminary read-out image signals.

6. A method as recited in claim 1, wherein said read-out conditions in the final read-out are adjusted on the basis of the information obtained by the preliminary read-out.

7. A radiation image read-out apparatus including:
(i) a final read-out system comprising a means for emitting stimulating rays to a stimulable phosphor sheet carrying a radiation image stored thereon, a means for moving said stimulable phosphor sheet, and a light detection means for photoelectrically detecting light carrying the radiation image and emitted by said stimulable phosphor sheet upon exposure to stimulating rays, and
(ii) a preliminary read-out system comprising a means for emitting stimulating rays, a means for moving said stimulable phosphor sheet, and a light detection means for photoelectrically detecting the light carrying the radiation image and emitted by said stimulable phosphor sheet upon exposure to stimulating rays, the stimulation energy of stimulating rays in the preliminary read-out being lower than the stimulation energy of stimulating rays in the final read-out, wherein the improvement comprises the provision of:
(iii) a means for creating a histogram of preliminary read-out image signals obtained by said preliminary read-out,
(iv) a means for detecting prospective edge point signals, which are considered to be signals representing edge portions of an irradiation field on said stimulable phosphor sheet, from said preliminary read-out image signals, and
(v) a histogram correction means for removing a region of a level lower than the level of a characteristic value representing said prospective edge point signals from said histogram.

8. An apparatus as defined in claim 7 wherein said characteristic value is a maximum frequency signal value of a histogram of said prospective edge point signals.

9. An apparatus as defined in claim 7 wherein said characteristic value is the minimum value of said prospective edge point signals.

10. An apparatus as defined in claim 7 wherein said characteristic value is a median value of said prospective edge point signals.

11. An apparatus as defined in any of claims 7 to 10 further comprising a switch for controlling the operation of said histogram correction means so that histogram correction is conducted only when said irradiation field is limited in an image recording step.

12. A radiation image read-out method in which a stimulable phosphor sheet exposed to a radiation passing through an object and through an irradiation field stop to have a radiation image of the object stored thereon is exposed in a final read-out to stimulating rays which cause the stimulable phosphor sheet to emit light in proportion to the stored radiation energy, and the emitted light is photoelectrically detected to obtain an electric image signal for reproducing a visible image, and image processing conditions are adjusted on the basis of the information obtained by the photoelectrical image read-out, wherein the improvement comprises the steps of:
(i) creating a histogram of frequencies of final read-out image signals obtained by said final read-out versus levels of said final read-out image signals,
(ii) detecting prospective edge point signals, which are considered to be signals representing edge portions of an irradiation field on said stimulable phosphor sheet, from said final read-out image signals,
(iii) removing a region of a level lower than the level of a characteristic value representing said prospective edge point signals from said histogram, and
(iv) adjusting said image processing conditions on the basis of said histogram outside of said lower level region.

13. An apparatus as defined in claim 12 wherein said characteristic value is a maximum frequency signal value of a histogram of said prospective edge point signals.

14. An apparatus as defined in claim 12 wherein said characteristic value is the minimum value of said prospective edge point signals.

15. An apparatus as defined in claim 12 wherein said characteristic value is a median value of said prospective edge point signals.

* * * * *

UNITED STATES PATENT AND TRADEMARK OFFICE
CERTIFICATE OF CORRECTION

PATENT NO. : 4,804,842

DATED : February 14, 1989

INVENTOR(S) : NOBUYOSHI NAKAJIMA

It is certified that error appears in the above-identified patent and that said Letters Patent is hereby corrected as shown below:

In Column 14:

Claim 12, line 1, delete "apparatus" and insert --method--.
Claim 13, line 1, delete "apparatus" and insert --method--.
Claim 14, line 1, delete "apparatus" and insert --method--.

Signed and Sealed this

Seventeenth Day of April, 1990

Attest:

HARRY F. MANBECK, JR.

*Attesting Officer*

*Commissioner of Patents and Trademarks*